United States Patent
Dutu et al.

(10) Patent No.: US 12,131,199 B2
(45) Date of Patent: Oct. 29, 2024

(54) WORKGROUP SYNCHRONIZATION AND PROCESSING

(71) Applicant: ADVANCED MICRO DEVICES, INC., Santa Clara, CA (US)

(72) Inventors: Alexandru Dutu, Bellevue, WA (US); Matthew David Sinclair, Bellevue, WA (US); Bradford Beckmann, Bellevue, WA (US); David A. Wood, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 969 days.

(21) Appl. No.: 17/029,935

(22) Filed: Sep. 23, 2020

(65) Prior Publication Data

US 2021/0373975 A1  Dec. 2, 2021

Related U.S. Application Data

(60) Provisional application No. 63/032,396, filed on May 29, 2020.

(51) Int. Cl.
*G06F 9/52* (2006.01)
*G06F 9/30* (2018.01)
(Continued)

(52) U.S. Cl.
CPC ............ *G06F 9/522* (2013.01); *G06F 9/3005* (2013.01); *G06F 9/461* (2013.01);
(Continued)

(58) Field of Classification Search
CPC ........ G06F 9/522; G06F 9/3005; G06F 9/461; G06F 11/3024; G06F 11/3476;
(Continued)

(56) References Cited

U.S. PATENT DOCUMENTS 7,844,973 B1 * 11/2010 Dice .................... G06F 9/52
710/200
8,176,491 B1 * 5/2012 Plummer ............ G06F 9/526
717/136

(Continued)

OTHER PUBLICATIONS

Vijayaraghavany, Thiruvengadam et al., "Design and Analysis of an APU for Exascale Computing," in Proceedings—International Symposium on High-Performance Computer Architecture, 2017, pp. 85-96.

(Continued)

*Primary Examiner* — Jorge A Chu Joy-Davila

(57) ABSTRACT

A processing system monitors and synchronizes parallel execution of workgroups (WGs). One or more of the WGs perform (e.g., periodically or in response to a trigger such as an indication of oversubscription) a waiting atomic instruction. In response to a comparison between an atomic value produced as a result of the waiting atomic instruction and an expected value, WGs that fail to produce a correct atomic value are identified as being in a waiting state (e.g., waiting for a synchronization variable). Execution of WGs in the waiting state is prevented (e.g., by a context switch) until corresponding synchronization variables are released.

20 Claims, 5 Drawing Sheets

(51) Int. Cl.
  *G06F 9/46* (2006.01)
  *G06F 11/30* (2006.01)
  *G06F 11/34* (2006.01)
  *G06N 20/00* (2019.01)
(52) U.S. Cl.
  CPC ...... *G06F 11/3024* (2013.01); *G06F 11/3476* (2013.01); *G06F 11/3495* (2013.01); *G06N 20/00* (2019.01)
(58) Field of Classification Search
  CPC ............. G06F 11/3495; G06F 9/30021; G06F 9/3004; G06F 9/30087; G06F 9/52; G06F 2201/865; G06F 11/3017; G06N 20/00
  See application file for complete search history.

(56) References Cited

U.S. PATENT DOCUMENTS

| | | | |
|---|---|---|---|
| 10,558,418 B2 | 2/2020 | Dutu et al. | |
| 2003/0163675 A1* | 8/2003 | Bennett | G06F 9/3851 712/E9.046 |
| 2010/0011195 A1* | 1/2010 | Ishii | G06F 9/3834 712/216 |
| 2013/0326524 A1* | 12/2013 | Houston | G06F 9/522 718/102 |
| 2014/0007111 A1* | 1/2014 | Targowski | G06F 9/505 718/102 |
| 2017/0083998 A1* | 3/2017 | Acharya | G06T 1/60 |
| 2018/0225047 A1* | 8/2018 | Mannava | G06F 3/0647 |
| 2020/0004586 A1 | 1/2020 | Dutu et al. | |
| 2020/0379820 A1 | 12/2020 | Dutu et al. | |
| 2021/0263785 A1* | 8/2021 | Valerio | G06F 9/3009 |

OTHER PUBLICATIONS

Diamos, Gregory et al., "Persistent RNNs : Stashing Recurrent Weights On-Chip," in International Conference on Machine Learning, 2016.
Arik, Mohammad Shoeybi Sercan et al., "Deep Voice: Real-time Neural Text-to-Speech Sercan," in Computers and Mathematics with Applications, 2013, vol. 65, No. 10, pp. 1471-1482.
Advanced Micro Devices, "Asynchronous Shaders Whitepaper," 2015, p. 9.
Tanasic, Ivan et al., "Enabling Preemptive Multiprogramming on GPUs," in ACM SIGARCH Computer Architecture News, 2014, vol. 42, No. 3, pp. 193-204.
Chen, Guoyang, et al., "EffiSha : A Software Framework for Enabling Efficient Preemptive Scheduling of GPU," in Proceedings of the 22nd ACM SIGPLAN Symposium on Principles and Practice of Parallel Programming, 2017, pp. 3-16.
Arik, Sercan et al., "Deep voice: Real-time neural text-to-speech," in 34th International Conference on Machine Learning, ICML 2017, 2017, vol. 1, No. Icml, pp. 264-273.
Zhu, Feiwen et al., "Sparse Persistent RNNs: Squeezing Large Recurrent Networks On-Chip," in arXiv preprint arXiv:1804.10223, 2018.
Sorensen, Tyler et al., "Portable Inter-workgroup Barrier Synchronisation for GPUs," in OOPSLA: ACM SIGPLAN International Conference on Object-Oriented Programming, Systems, Languages, and Applications, 2016, pp. 39-58.
McCool, Michael D. et al., "Shader Metaprogramming," 2002, pp. 57-68.
Mark, William R. et al., "Cg: a system for programming graphics hardware in a C-like language," in ACM Transactions on Graphics, 2003, vol. 22, No. 3, p. 896.
Houston, Mike, "Brook for GPUs : Stream Computing on Graphics Hardware," 2001.
CUDA, Nvidia, "Compute unified device architecture programming guide," 2007.
Munshi, Aaftab, "The opencl specification," in Hot Chips 21 Symposium (HCS), 2009 IEEE, 2009, pp. 1-314.
AMD, "HSA Programmer's Reference Manual: HSAIL Virtual ISA and Programming Model, Compiler Writer, and Object Format (BRIG)," 2019. [Online]. Available: http://www.hsafoundation.com/standards/. [Accessed: Aug. 16, 2019].
AMD, "HSA Platform System Architecture Specification," 2019. [Online]. Available: http://www.hsafoundation.com/standards/.
Nvidia, "Nvidia Tesla V100 Gpu Architecture," 2017.
Lelbach, Bryce A. et al., "The C++20 Synchronization Library," 2018. [Online]. Available: https://isocpp.org/files/papers/p1135r1.html. [Accessed: Aug. 16, 2019].
Wong, Henry et al., "Pangaea : A Tightly-Coupled IA32 Heterogeneous Chip Multiprocessor Categories and Subject Descriptors," in 2008 International Conference on Parallel Architectures and Compilation Techniques (PACT), 2008, pp. 52-61.
Kumar, Sameer et al., "Acceleration of an asynchronous message driven programming paradigm on IBM Blue Gene/Q," in Proceedings—IEEE 27th International Parallel and Distributed Processing Symposium, IPDPS 2013, 2013, pp. 689-699.
Tullsen, Dean M. et al., "Supporting fine-grained synchronization on a simultaneous multithreading processor," in Proceedings Fifth International Symposium on High-Performance Computer Architecture, 1999, pp. 54-58.
AMD, "AMD64 Architecture Programmer's Manual vol. 3: General-Purpose andSystem Instructions," 2017, No. 24594.
Hansen, Per Brinch, "Structured Multi-programming," in Communications of the ACM, 1972, vol. 15, No. 7, pp. 574-578.
Lampson, Butler W., and Redell, David D., "Experience with processes and monitors in Mesa," in Communications of the ACM, 1980, vol. 23, No. 2, pp. 105-117.
Goodman, James R. et al., "Efficient Synchronization Primitives for Large-Scale Cache-Coherent Multiprocessors," in Proceedings of the Third International Conference on Architectural Support for Programming Languages and Operating Systems, 1989, pp. 64-75.
Goodman, James R., and Woest Philip J., "The Wisconsin Multicube: A New Large-Scale Cache-Coherent Multiprocessor," in ACM SIGARCH Computer Architecture News, 1988, vol. 16, No. 2, pp. 422-431.
Alverson, Robert et al., "The Tera Computer System *," in Proceedings of the 4th international conference on Supercomputing, 1990, pp. 1-6.
Liu, Jiwei et al., "SAWS: Synchronization Aware GPGPU Warp Scheduling for Multiple Independent Warp Schedulers," in Proceedings of the 48th International Symposium on Microarchitecture—MICRO-48, 2015, pp. 383-394.
Eltantawy, Ahmed, and Aamodt, Tor M., "MIMD Synchronization on SIMT Architectures," in 2016 49th Annual IEEE/ACM International Symposium on Microarchitecture (MICRO), 2016, pp. 1-14.
Bradley, Thomas, "Hyper-Q Example," 2013. [Online]. Available: http://developer.download.nvidia.com/compute/DevZone/C/html_x64/6_Advanced/simpleHyperQ/doc/HyperQ.pdf. [Accessed: Aug. 16, 2019].
Nvidia, "CUDA Stream Management," 2019. [Online]. Available: http://developer.download.nvidia.com/compute/cuda/2_3/toolkit/docs/online/group_CUDART_STREAM.html. [Accessed: Aug. 16, 2019].
AMD, "HIP: Heterogeneous-computing Interface for Portability," 2019. [Online]. Available: https://github.com/ROCm-Developer-Tools/HIP/. [Accessed: Aug. 16, 2019].
Luitjens, Justin, "CUDA Streams: Best Practices and Common Pitfalls," 2014. [Online]. Available: http://on-demand.gputechconf.com/gtc/2014/presentations/S4158-cuda-streams-best-practices-common-pitfalls.pdf. [Accessed: Aug. 16, 2019].
Lin, Zhen et al., "Enabling Efficient Preemption for SIMT Architectures with Lightweight Context Switching," in SC'16: Proceedings of the International Conference for High Performance Computing, Networking, Storage and Analysis, 2016, No. November, pp. 898-908.
Lin, Zhen, and Mantor, Michael, "GPU performance vs. thread-level parallelism: Scalability analysis and a novel way to improve TLP," in ACM Transactions on Architecture and Code Optimization (TACO), 2018, vol. 15, No. 1, pp. 1-21.

(56) References Cited

OTHER PUBLICATIONS

Hajj, Izzat El et al., "KLAP : Kernel Launch Aggregation and Promotion for Optimizing Dynamic Parallelism," in 2016 49th Annual IEEE/ACM International Symposium on Microarchitecture (MICRO), 2016, pp. 1-12.
Wang, Jin et al., "Dynamic Thread Block Launch : A Lightweight Execution Mechanism to Support Irregular Applications on GPUs," in ACM SIGARCH Computer Architecture News, 2015, vol. 43, No. 3S, pp. 528-540.
Wang, Zhenning et al., "Simultaneous Multikernel GPU: Multi-tasking throughput processors via fine-grained sharing," in Proceedings—International Symposium on High-Performance Computer Architecture, 2016, vol. Apr. 2016, pp. 358-369.
Wu, Hancheng et al., "Compiler-Assisted Workload Consolidation for Efficient Dynamic Parallelism on GPU," in Proceedings—2016 IEEE 30th International Parallel and Distributed Processing Symposium, IPDPS 2016, 2016, pp. 534-543.
Chen, Guoyang, and Shen, Xipeng, "Free launch: optimizing GPU dynamic kernel launches through thread reuse," in Proceedings of the 48th International Symposium on Microarchitecture, 2015, pp. 407-419.
Jong, Jason et al., "Chimera : Collaborative Preemption for Multitasking on a Shared GPU," in ACM SIGARCH Computer Architecture News, 2015, vol. 43, No. 1, pp. 593-606.
AMD, "Graphics Core Next Architecture, Generation 3," 2016. [Online]. Available: http://developer.amd.com/wordpress/media/2013/12/AMD_GCN3_Instruction_Set_Architecture_rev1.1.pdf. [Accessed: Aug. 16, 2019].
Liu, Jiwei, "Efficient Synchronization for GPGPU," 2018.
Gupta, Kshitij, and Stuart, Jeff, "A Study of Persistent Threads Style Programming Model for GPU Computing," in Nvidia GTC, 2012.
Sun, Yifan et al., "Hetero-Mark, A Benchmark Suite for CPU-GPU Collaborative Computing," in 2016 IEEE International Symposium on Workload Characterization (IISWC), 2016, pp. 1-10.
Belviranli, Mehmet E. et al., "PeerWave: Exploiting Wavefront Parallelism on GPUs with Peer-SM Synchronization," in Proceedings of the 29th ACM on International Conference on Supercomputing, 2015, pp. 25-35.
Stuart, Jeff A., and Owens, John D., "Efficient Synchronization Primitives for GPUs," in arXiv preprint arXiv:1110.4623, 2011, p. 13.
Xiao, Shucai, and Feng, Wu Chun, "Inter-block GPU communication via fast barrier synchronization," in Proceedings of the 2010 IEEE International Symposium on Parallel and Distributed Processing, IPDPS 2010, 2010, pp. 1-11.
Sorensen, Tyler et al., "GPU schedulers: how fair is fair enough?," in 29th International Conference on Concurrency Theory (CONCUR 2018), 2018, No. 23, pp. 1-17.
Abdolrashidi, Amir Ali et al., "Wireframe : Supporting Data-dependent Parallelism through Dependency Graph Execution in GPUs," in Proceedings of the 50th Annual IEEE/ACM International Symposium on Microarchitecture, 2017, pp. 600-611.
Gutierrez, Anthony et al., "Lost in Abstraction : Pitfalls of Analyzing GPUs at the Intermediate Language Level," in 2018 IEEE International Symposium on High Performance Computer Architecture (HPCA), 2018, pp. 608-619.
Alglave, Jade et al., "GPU Concurrency: Weak Behaviours and Programming Assumptions," in Proceedings of the Twentieth International Conference on Architectural Support for Programming Languages and Operating Systems—ASPLOS '15, 2015, vol. 43, No. 1, pp. 577-591.
Sinclair, Matthew D. et al., "Chasing Away RAts : Semantics and Evaluation for Relaxed Atomics on Heterogeneous Systems," in Proceedings of the 44th Annual International Symposium on Computer Architecture, 2017, pp. 161-174.
Sinclair, Matthew D. et al., "Efficient GPU synchronization without scopes: Saying no to complex consistency models," in Proceedings of the Annual International Symposium on Microarchitecture, MICRO, 2015, vol. 05-09-Dece, pp. 647-659.
Sinclair, Matthew D. et al., "HeteroSync: A benchmark suite for fine-grained synchronization on tightly coupled GPUs," in Workload Characterization (IISWC), 2017 IEEE International Symposium on, 2017, pp. 239-249.
Hower, Derek R. et al., "Heterogeneous-race-free Memory Models," in Proceedings of the 19th international conference on Architectural support for programming languages and operating systems, 2014, pp. 427-440.
Fung, Wilson Wai Lun et al., "Hardware Transactional Memory for GPU Architectures," in 2011 44th Annual IEEE/ACM International Symposium on Microarchitecture (MICRO), 2011, pp. 296-307.
Li, Tong et al., "Spin detection hardware for improved management of multithreaded systems," in Parallel and Distributed Systems, IEEE Transactions on, 2006, vol. 17, No. 6, pp. 508-521.
Thottethodi, Mithuna et al., "Self-tuned congestion control for multiprocessor networks," in Proceedings HPCA Seventh International Symposium on High-Performance Computer Architecture, 2001, pp. 107-118.
Nvidia, "CUDA Instruction Set Reference," 2019. [Online]. Available: https://docs.nvidia.com/cuda/cuda-binary-utilities/index.html#instruction-set-ref. [Accessed: Aug. 16, 2019].
Orr, Marc S. et al., "Fine-grain task aggregation and coordination on GPUs," in Proceedings—International Symposium on Computer Architecture, 2014, pp. 181-192.
Gaster, Benedict R., and Howes, Lee, "Can GPGPU programming be liberated from the data-parallel bottleneck?," in Computer, 2012, vol. 45, No. 8, pp. 42-52.
Carter, J. Lawrence, and Wegman, Mark N., "Universal Classes of Hash Functions," in Journal of Computer and System Sciences, 1979, vol. 18, No. 2, pp. 143-154.
Yoon, Myung Kuk et al., "Virtual Thread : Maximizing Thread-Level Parallelism beyond GPU Scheduling Limit," in 2016 ACM/IEEE 43rd Annual International Symposium on Computer Architecture (ISCA), 2016, pp. 609-621.
Jeon, Hyeran, et al., "GPU register file virtualization," in Proceedings of the 48th International Symposium on Microarchitecture—MICRO-48, 2015, pp. 420-432.
Vijaykumar, Nandita et al., "Zorua: A holistic approach to resource virtualization in GPUs," in 2016 49th Annual IEEE/ACM International Symposium on Microarchitecture (MICRO), 2016, pp. 1-14.
Richards, David M., et al., "Quicksilver," 2016. [Online]. Available: https://www.osti.gov/biblio/1313660.
US DOE, "Quicksilver." [Online]. Available: https://proxyapps.exascaleproject.org/app/quicksilver/.
G. Diamos, "Persistent RNNs," 2019. [Online]. Available: https://svail.github.io/persistent_rnns/. [/accessed: Aug. 16, 2019].

* cited by examiner

WORKGROUP SYNCHRONIZATION AND PROCESSING

CROSS-REFERENCE TO RELATED APPLICATIONS

The present application claims priority to Provisional Patent Application Ser. No. 63/032,396, entitled "FINE-GRAINED SYNCHRONIZATION THROUGH WAITING ATOMICS" and filed on May 29, 2020, the entirety of which is incorporated by reference herein.

GOVERNMENT LICENSE RIGHTS

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Graphics Processing Units (GPUs) have evolved from providing highly-constrained programmability for a single kernel to using pre-emption to ensure independent forward progress for concurrently executing kernels. However, GPUs do not ensure independent forward progress for kernels that use fine-grain synchronization to coordinate inter-workgroup execution. In particular, in some cases where pre-empted kernels are rescheduled with fewer hardware resources, oversubscribed execution scenarios occur that cause hardware deadlocks even with correctly written code, preventing independent forward progress.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Failure to meet latency sensitive deadlines or even deadlocks occur in some cases in processing systems where resources such as synchronization variables are assigned to workgroups (WGs) or work items (WIs) or threads within WGs and where resource contention is present. In particular, in some cases, WGs that are waiting for synchronization variables are unable to continue execution but also hold synchronization variables that prevent other WGs from continuing execution. Further, detecting which WGs are waiting for at least one synchronization variable is difficult because the number of WGs per kernel frequently varies at runtime. Additionally, performing context switches of waiting WGs in such a system is impractical because it is difficult to detect which WGs are waiting.

As described herein, a processing system detects WGs that are waiting for at least one synchronization variable by instructing the WGs to perform waiting atomic instructions (atomic instructions with an extra operand that indicates an expected value of a synchronization variable for the atomic to succeed). In some cases, WGs that are waiting for a synchronization variable will fail to generate an operand having the expected value as a result of the waiting atomic instruction. Accordingly, the processing system detects the WGs that are waiting for at least one synchronization variable by comparing loaded data of the WGs generated as a result of the waiting atomic instruction with one or more respective expected values. Further, in some embodiments, the processing system monitors WGs that are waiting for a synchronization variable and, in some cases, prevents execution of those WGs (e.g., by indicating that those WGs should be switched out via a context switch). Additionally, the processing system detects when synchronization variables are released (e.g., by WGs performing waiting atomic instructions or other instructions) and indicates that WGs waiting for those synchronization variables should be awakened. Accordingly, a system that synchronizes and processes WGs is described.

Figure 1:
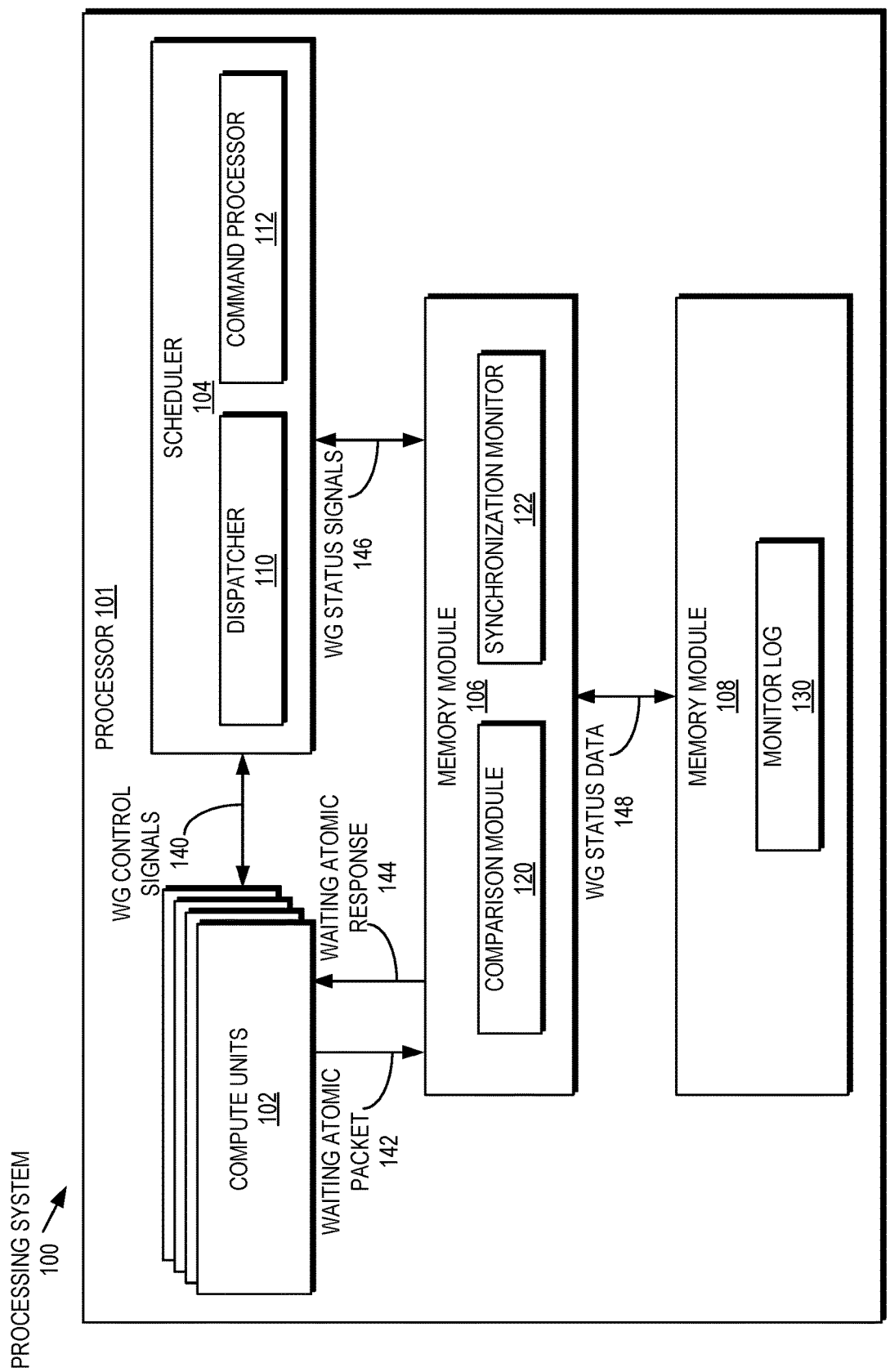
FIG. 1 is a block diagram of a processing system employing a processor that synchronizes and processes workgroups in accordance with some embodiments.

FIG. 1 illustrates a processing system 100 in accordance with some embodiments. In the illustrated embodiment, processing system 100 includes processor 101 comprising a plurality of compute units 102, scheduler 104, memory module 106, and memory module 108. Scheduler 104 includes dispatcher 110 and command processor 112. Memory module 106 includes comparison module 120 and synchronization monitor 122. Memory module 108 includes monitor log 130. Although the illustrated embodiment shows a specific configuration of components, in various embodiments, other combinations of components are contemplated. Further, in some embodiments, additional components such as cache memories between memory module 106 and compute units 102 are contemplated but not illustrated for ease of discussion. In some embodiments, some illustrated components are combined (e.g., memory module 106 and memory module 108) or are not included. In some embodiments, some illustrated components (e.g., dispatcher 110, synchronization monitor 122, monitor log 130, etc.) are distributed between multiple hardware components (e.g., multiple memory modules).

As further discussed below with reference to FIG. 5, processing system 100 is designed for implementation as part of a device such as a desktop or laptop computer, server, smartphone, tablet, game console, or other electronic device. The device includes a central processing unit (CPU) that sends various commands or instructions (e.g., threads) to a processor including processing system 100. In such embodiments, processor 101 of processing system 100 is a GPU, machine learning application specific integrated circuit (ASIC) or other co-processor or hardware accelerator that cooperatively executes in conjunction with the CPU to perform various computational tasks.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). FIG. 1 illustrates an example of a parallel processor, and in particular a processing system 100, in accordance with some embodiments.

In the illustrated embodiment, compute units 102 execute operations as part of various WGs. In some embodiments, compute units 102 are part of a virtualized system in which at least some WGs are waiting to begin or continue execution. At various times (e.g., when one or more WGs are to be context switched out), compute units 102 perform waiting atomic instructions as part of execution of the WGs, which identifies time periods where the WGs are waiting and able to yield synchronization variables. For example, in some cases, a waiting atomic instruction is an atomic compare-and-swap operation. As another example, in some cases, a waiting atomic instruction is an atomic compare-and-wait operation that loads an address specified by an ADDR operand, compares the returned value with a value specified by a DATA operand, writes the comparison result to a vector destination (VDST) operand, and waits if the loaded address does not match the value specified by the DATA operand. Execution of the waiting atomic instructions by various WGs generate waiting atomic values. One or more of the waiting atomic values are sent to memory module 106 with corresponding expected values in waiting atomic packets 142.

As further described below with reference to FIG. 2, memory module 106 detects waiting WGs and monitors the waiting WGs. Based on comparison module 120 determining that a waiting atomic value (e.g., waiting atomic packet 142), a value generated or retrieved from memory as part of the waiting atomic, fails to match a corresponding expected value (e.g., from waiting atomic packet 142 or from a different waiting atomic packet), a value specified by an operand of the waiting atomic or stored at a location within processing system 100, synchronization monitor 122 monitors the corresponding WG. In some embodiments, synchronization monitor 122 stores identification data corresponding to the monitored WG (e.g., a WG identifier (ID)), addresses of one or more synchronization variables the monitored WG is awaiting, values of the one or more synchronization values, or any combination thereof. In some embodiments, memory module sends some or all of the identification data (e.g., all of the identification data or identification data in excess of an amount that can be stored in synchronization monitor 122) to memory module 108 as WG status data 148. Additionally, in some embodiments, memory module 106 sends waiting atomic response 144 to compute units 102, indicating whether various WGs can be context switched out based on whether the waiting atomic values matched the corresponding expected values. Further, when other operations are performed, such as atomic operations that are not waiting atomic operations, synchronization monitor 122 detects whether those operations correspond to one of the monitored synchronization variables. Synchronization monitor 122 monitors updates to identified synchronization variables and stores at least some characteristics of the updates to those variables either locally or at memory module 108. Accordingly, in some embodiments, synchronization monitor 122 is used to determine which waiting WGs should be resumed for execution because, for example, previously unavailable synchronization variables are now available. In some embodiments, synchronization monitor 122 indicates that multiple waiting WGs should be resumed.

Memory module 108 stores WG status data 148 in monitor log 130. As described above, in various embodiments, WG status data 148 identification data corresponding to a monitored WG (e.g., a WG identifier), addresses of one or more synchronization variables the monitored WG is awaiting, values of the one or more synchronization values, or any combination thereof. In various embodiments, memory module 108 is main memory of a processor that includes processing system 100 (e.g., in systems where WG synchronization is shared across multiple compute agents or heterogeneous system architecture (HSA) agents). In some embodiments, memory module 108 is part of a GPU device memory. In some cases, monitor log 130 is allocated at boot time by an operating system (OS) kernel or a GPU driver.

As further described below with reference to FIG. 3, scheduler 104 keeps track of context switched WGs and coordinates WG context switching. In particular, scheduler 104 receives WG status signals 146 (e.g., in response to synchronization monitor 122 monitoring a WG, in response to a request from scheduler 104, or both), which indicate statuses of WGs stored at synchronization monitor 122, monitor log 130, or both. Scheduler 104 uses command processor 112 to manage the statuses of the WGs. In particular, command processor 112 tracks waiting WGs, waiting conditions, and the state of waiting WGs as they are stalled, context switching out, waiting, ready, or context switching in. Additionally, in some embodiments, command processor 112 is used to track spilled synchronization variables. In some embodiments, command processor 112 requests context switches of various WGs at compute units 102 based on the statuses of the WGs. Dispatcher 110 assigns WG IDs to WGs and identifies the WGs at compute units 102 on behalf of command processor 112 via WG control signals 140.

Accordingly, processing system 100 synchronizes and controls the execution of WGs such that, in some cases, deadlocks are prevented.

Figure 2:
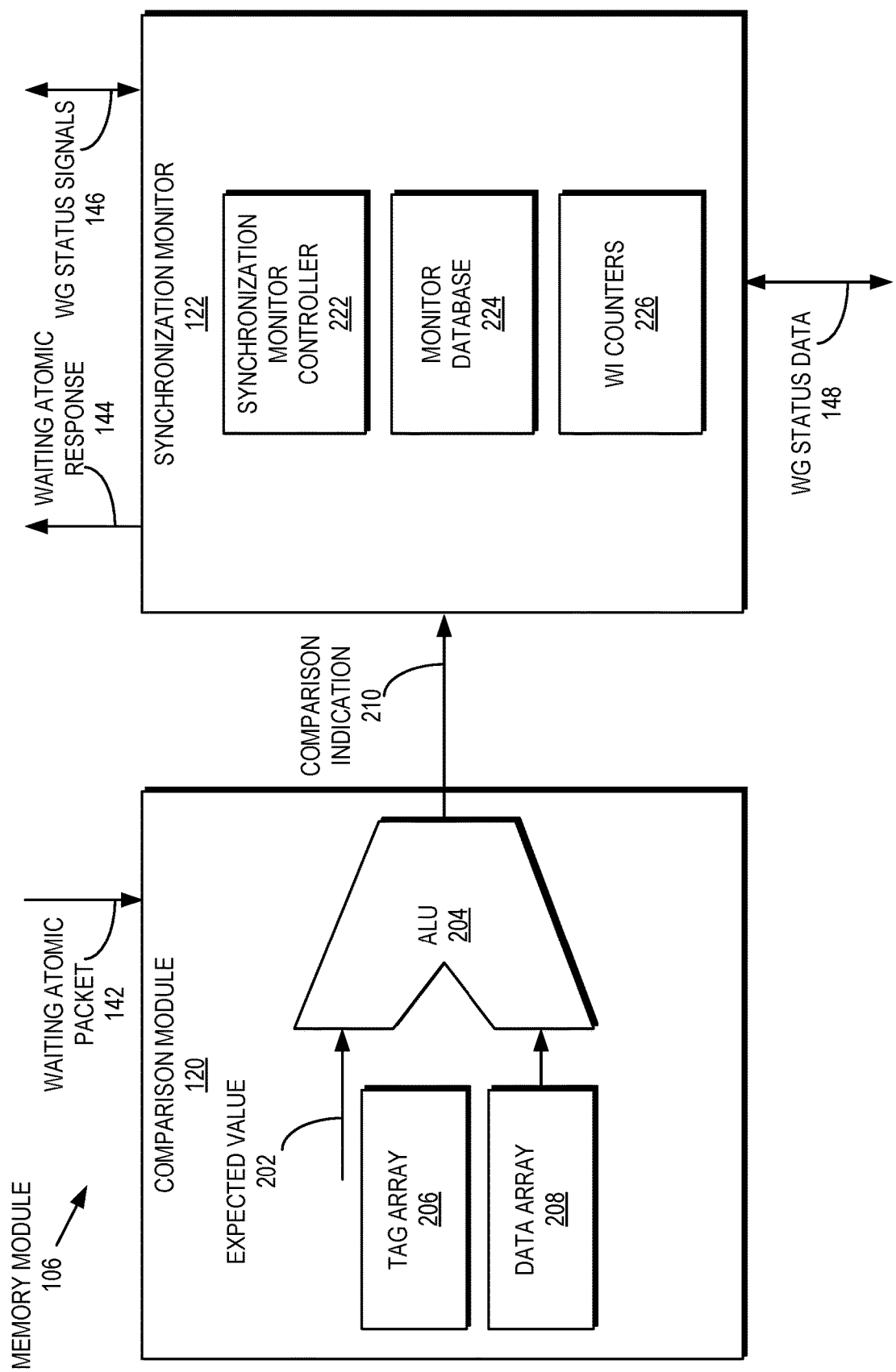
FIG. 2 is a block diagram of memory module of the processing system in accordance with some embodiments.

FIG. 2 is a block diagram illustrating memory module 106 of FIG. 1 in accordance with some embodiments. In the illustrated embodiment, memory module 106 includes comparison module 120 and synchronization monitor 122. Comparison module 120 includes arithmetic logic unit (ALU) 204, tag array 206, and data array 208. Synchronization monitor 122 includes synchronization monitor controller 222, monitor database 224, and WI counters 226. Although the illustrated embodiment shows a specific configuration of components, in various embodiments, other combinations of components are contemplated. Further, in some embodiments, additional components such as buffers are contemplated but not illustrated for ease of discussion.

As described above, memory module 106 receives waiting atomic packet 142 that includes an expected value, input into ALU 204 as expected value 202, a waiting atomic value stored at data array 208, and WG identification data stored at tag array 206. ALU 204 compares expected value 202 to the waiting atomic value and indicates whether the two values match to synchronization monitor 122 via comparison indication 210. In some embodiments, comparison indication 210 is sent only when the two values fail to match.

Synchronization monitor 122 receives indications of whether waiting atomic values of WGs match expected values via comparison indication 210, indicating to synchronization monitor 122 which WGs are waiting for synchronization variables and which WGs are in critical sections. In response to receiving comparison indication, synchronization monitor controller 222 stores data indicative of the WG corresponding to the comparison and data indicative of monitored addresses (e.g., corresponding to synchronization variables) associated with the WG in monitor database 224. In some embodiments, synchronization monitor 122 monitors more WGs than there are entries in monitor database 224. Accordingly, in some embodiments, some data indicative of the WG corresponding to the comparison and data indicative of monitored addresses associated with the WG is sent to monitor log 130 as WG status data 148. In other embodiments, all data indicative of the WG corresponding to the comparison and data indicative of monitored addresses associated with the WG is sent to monitor log 130 as WG status data 148 (e.g., because monitor database 224 is not present). Additionally, in response to receiving comparison indication 210, synchronization monitor controller 222 sends waiting atomic response 144 to a corresponding compute unit 102, indicating whether the corresponding WG can be context switched out based on whether the waiting atomic value matched the expected value.

Additionally, synchronization monitor 122 provides status information regarding waiting WGs to scheduler 104 via status signals 146. In some cases, the requested status information is retrieved from monitor database 224. In other cases, such as cases where more status information is received than synchronization monitor 122 has dedicated to the status information, the requested data is retrieved from monitor log 130 via WG status data 148.

Further, synchronization monitor 122 determines which WGs to resume for execution. In response to an indication of a WG resumption (e.g., from scheduler 104 or from a compute unit 102), synchronization monitor controller 222 determines which synchronization variables are sought by which WGs and indicates one or more WGs to resume execution based on available synchronization variables. Synchronization monitor controller indicates the identified WGs to the corresponding compute unit 102 (e.g., directly or via scheduler 104). In some embodiments, synchronization monitor controller 222 attempts to maximize a number of active WGs. In other embodiments, other priority schemes are used.

In some embodiments, synchronization monitor 122 monitors work-item (WI) granularity synchronization of WGs. In such cases, synchronization monitor 122 tracks synchronization values acquired by the WIs of the WGs in WI counters 226. Additionally, WI counters 226 tracks the number of active WIs within all of the wavefronts of a WG and count the number of WIs that have acquired respective synchronization variables. In some embodiments, synchronization monitor 122 indicates that a WG can be safely context switched out only if all of the WIs have released respective synchronization variables.

Figure 3:
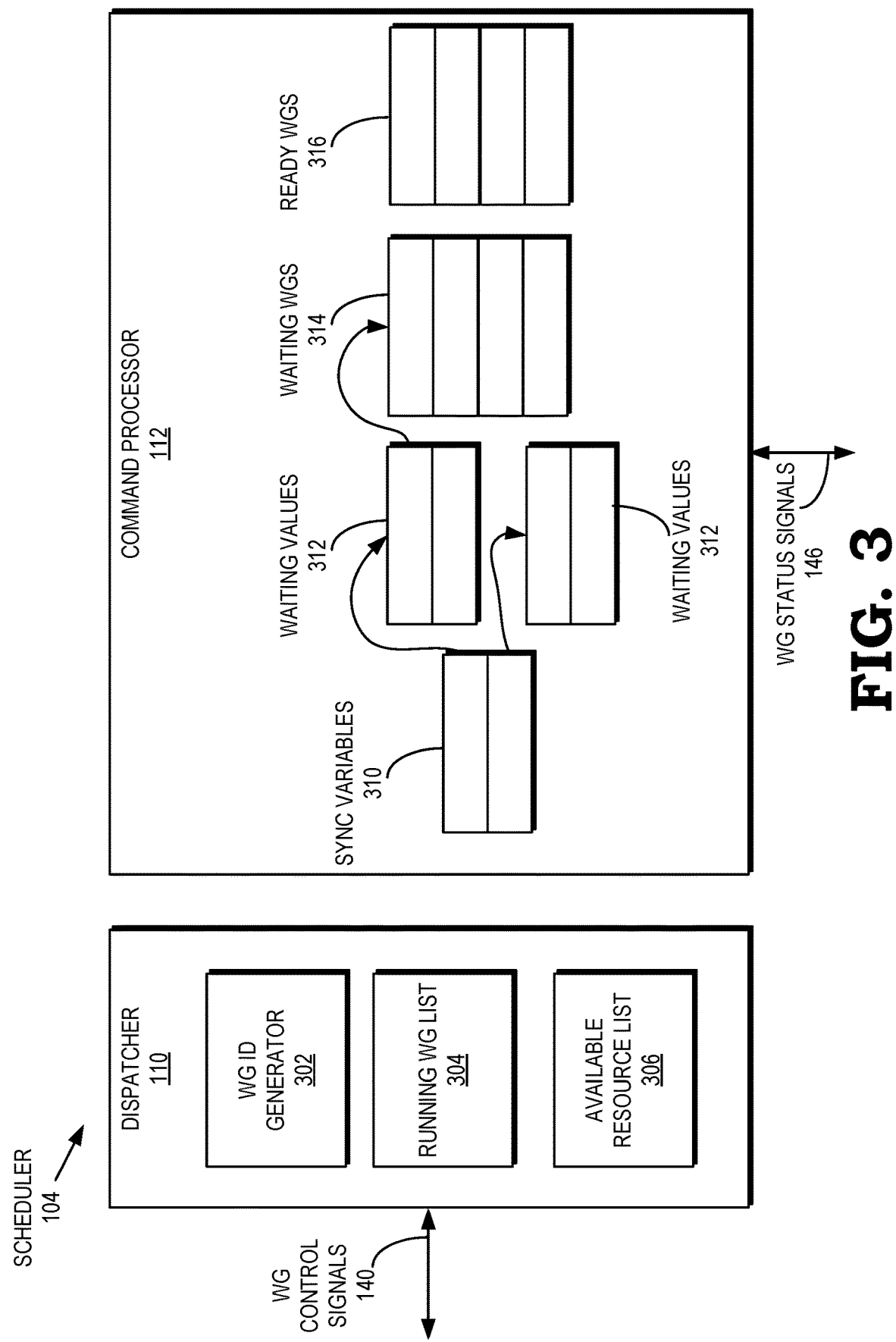
FIG. 3 is a block diagram of a scheduler of the processing system in accordance with some embodiments.

FIG. 3 is a block diagram illustrating scheduler 104 of FIG. 1 in accordance with some embodiments. In the illustrated embodiment, scheduler 104 includes dispatcher 110 and command processor 112. Dispatcher 110 includes WG ID generator 302, running WG list 304, and available resource list 306. Command processor 112 includes various information including synchronization variables 310, waiting values 312, waiting WGs 314, and ready WGs 316. Although the illustrated embodiment shows a specific configuration of components, in various embodiments, other combinations of components are contemplated. Further, in some embodiments, additional components such as buffers are contemplated but not illustrated for ease of discussion.

As described above, dispatcher 110 assigns unique IDs to each dispatched WG. In some embodiments, this WG ID is used throughout the scheduling process, from registering waiting WGs and managing their waiting conditions and memory storage for their contexts, to communicating to the CU and indicating what WGs should be context switched. In the illustrated embodiment, WG IDs are generated by WG ID generator 302 and the WG IDs for each running WG are stored at running WG list 304. Additionally, in some embodiments, dispatcher 110 stores information regarding availability of execution resources (e.g., compute units 102 and registers) and memory resources (e.g., memory devices associated with compute units 102). Further, because dispatcher 110 stores the WG IDs, dispatcher 110 is used to communicate context switch indications from command processor 112 to compute units 102.

Command processor 112 manages monitor log entries and requests WG context switches. In particular, command processor 112 detects spilled synchronization variables by parsing monitor log 130 of FIG. 1 via WG status signals 146. Command processor 112 uses an internal data structure that tracks data such as synchronization variables 310, waiting values 312, waiting WGs 314, and ready WGs 316. In some embodiments, command processor 112 additionally periodically checks waiting conditions of spilled synchronization variables (e.g., by requesting data updates from synchronization monitor 122, monitor log 130, or both). In some embodiments, command processor 112 checks waiting conditions at synchronization monitor 122 and monitor log 130 in response to an indication that a memory of synchronization monitor 122 that stores synchronization variable information is full. Otherwise, in those embodiments, synchronization monitor 122 sends recommendations of WGs to be switched in or out. Additionally, in some cases, command processor 112 receives requests of WGs to be context switched out (e.g., from synchronization monitor 122 directly or from compute units 102 via dispatcher 110). In response to an indication from compute unit 102 that the context switch has been completed, command processor 112 instructs compute unit 102 to context switch in various WGs (e.g., based on WG status signals 146 received from synchronization monitor 122).

Figure 4:
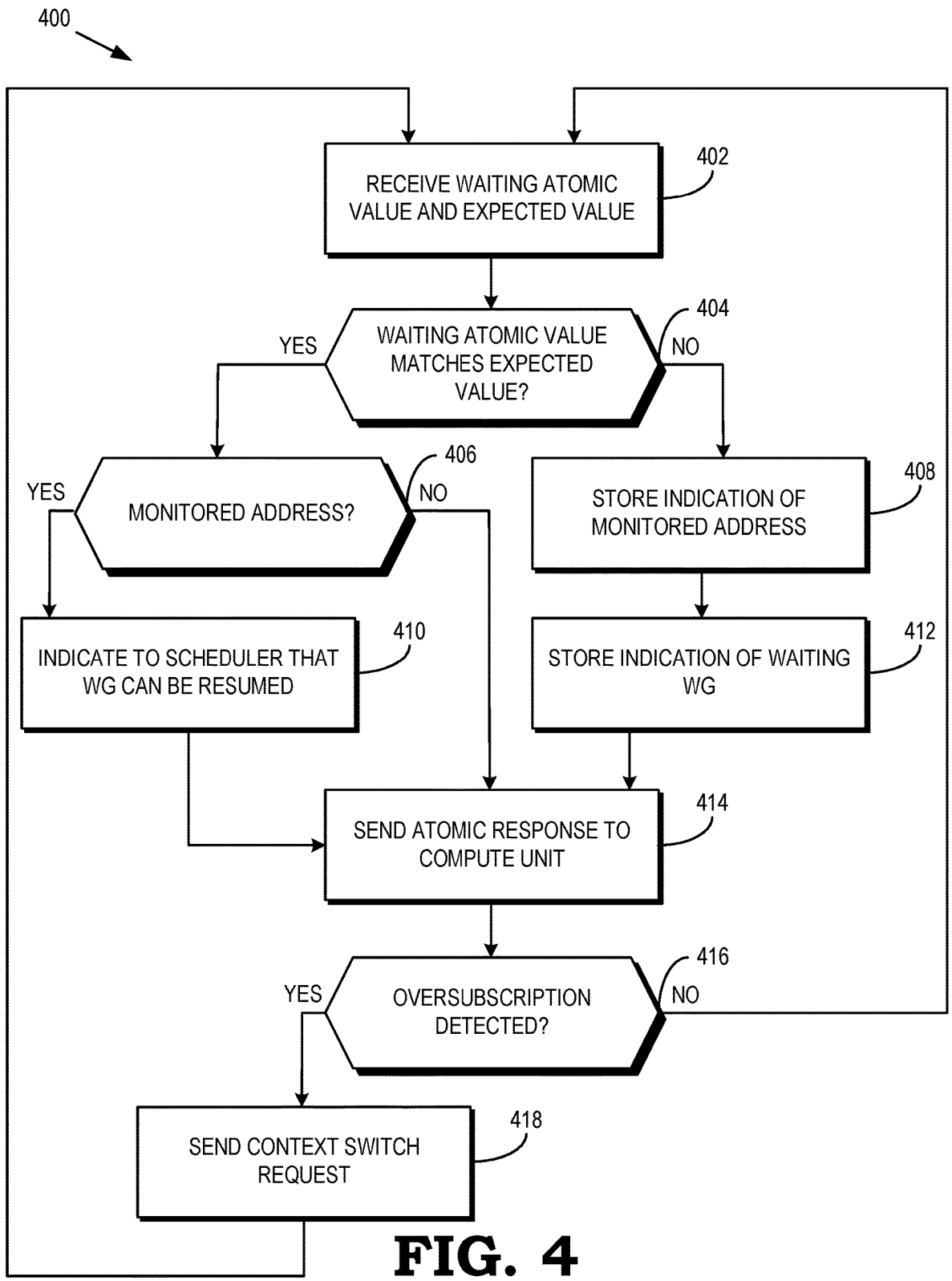
FIG. 4 is a flow diagram illustrating a method of synchronizing and processing workgroups in accordance with some embodiments.

FIG. 4 is a flow diagram illustrating a method 400 of synchronizing and processing workgroups in accordance with some embodiments. Method 400 is implemented, in some embodiments, by a memory module such as memory module 106 of FIGS. 1 and 2. In some embodiments, method 400 is initiated by one or more processors in response to one or more instructions stored by a computer-readable storage medium.

At block 402, a waiting atomic value and an expected value for a WG are received. For example, the waiting atomic value and the expected value are received as part of waiting atomic packet 142. At block 404, the waiting atomic value is compared to the expected value. For example, ALU 204 compares expected value 202 to the value stored in data array 208. If the two values match, method 400 proceeds to block 406. If the two values fail to match, method 400 proceeds to block 408.

At block 406, in response to the waiting atomic value matching the expected value, the memory module determines whether the WG corresponds to a monitored address. For example, synchronization monitor 122 determines whether the WG corresponds to a monitored address of a synchronization variable under resource contention (e.g., because the WG is releasing the synchronization variable). If the WG corresponds to a monitored address, method 400 proceeds to block 410. If the WG does not correspond to a monitored address, method 400 proceeds to block 414.

At block 410, in response to detecting that the WG corresponds to a monitored address, the memory module indicates to the scheduler that another WG can be resumed. For example, in response to detecting the release of a synchronization variable under resource contention, synchronization monitor 122 indicates to scheduler 104 via WG status signals 146 that another WG that was waiting for the synchronization variable is ready to be resumed.

Additionally, in some embodiments, another operation such as an atomic operation that is not a waiting atomic operation is performed by a WG, where the WG corresponds to a monitored address. Synchronization monitor indicates to scheduler 104 via WG status signals 146 that another WG that was waiting for the synchronization variable is ready to be resumed.

At block 408, in response to the waiting atomic value failing to match the expected value, the memory module stores an indication of a monitored address corresponding to the WG. For example, synchronization monitor 122 stores an indication of an address of a synchronization value the WG is awaiting. At block 412, the memory module stores an indication of the waiting WG. For example, synchronization monitor 122 stores a WG ID of the waiting WG.

At block 414, subsequent to one of blocks 406, 410, or 412, the memory module sends a response to the compute unit. For example, memory module 106 sends waiting atomic response 144 to compute unit 102 indicating results of the comparison. At block 416, the memory module determines whether the compute units are oversubscribed. If the compute units are oversubscribed, method 400 proceeds to block 418. If the compute units are not oversubscribed, method 400 proceeds to block 402. At block 418 in response to detecting that the compute units are oversubscribed, the memory module sends a context switch request. For example, memory module 106 indicates to scheduler 104 via the compute unit 102 that certain WGs should be context switched out. Method 400 then proceeds to block 402. Accordingly, a method of detecting an event and providing a debug state machine indication to an extended performance monitor counter is depicted.

Figure 5:
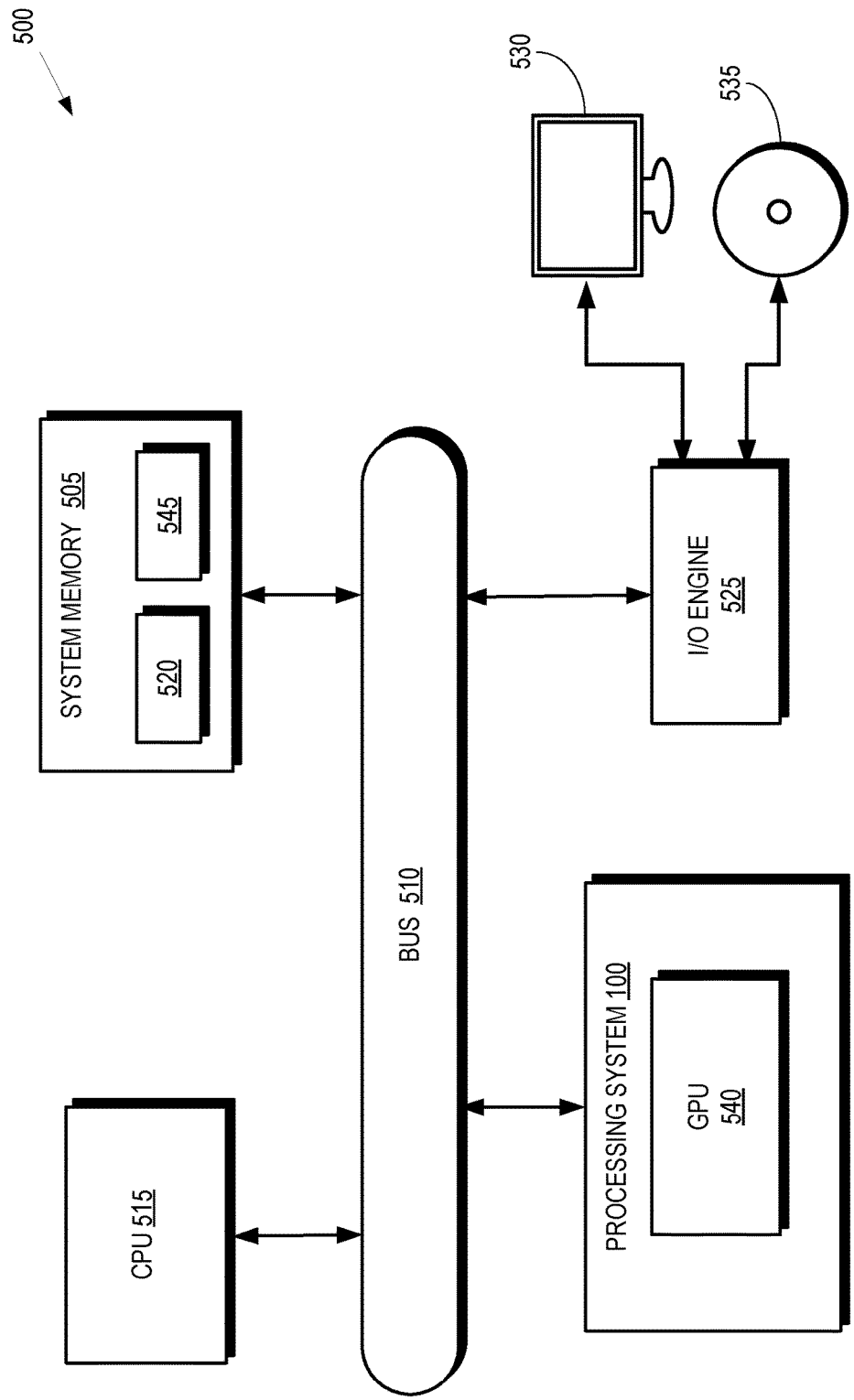
FIG. 5 is a block diagram of a computing system that includes a processing system that synchronizes and processes workgroups according to some embodiments.

FIG. 5 is a block diagram depicting of a computing system 500 that includes a processing system 100 that synchronizes and processes WGs according to some embodiments. Computing system 500 includes or has access to a system memory 505 or other storage component that is implemented using a non-transitory computer readable medium such as a dynamic random-access memory (DRAM). However, system memory 505 can also be implemented using other types of memory including static random-access memory (SRAM), nonvolatile RAM, and the like. Computing system 500 also includes a bus 510 to support communication between entities implemented in computing system 500, such as system memory 505. Some embodiments of computing system 500 include other buses, bridges, switches, routers, and the like, which are not shown in FIG. 5 in the interest of clarity.

Computing system 500 includes processing system 100 which includes a GPU 540 that is configured to render images for presentation on a display 530. For example, the GPU 540 can render objects to produce values of pixels that are provided to display 530, which uses the pixel values to display an image that represents the rendered objects. Some embodiments of GPU 540 can also be used for general purpose computing. In the illustrated embodiment, GPU 540 processing system 100 for synchronizing and processing workgroups. As discussed above, processing system 100 detects WGs waiting for synchronization variables and triggers context switches to WGs able to make progress. Although the illustrated embodiment illustrates GPU 540 as being included in processing system 100, in other embodiments, processing system 100 includes fewer, additional, or different components. Additionally, in some embodiments, portions of processing system 100 (e.g., memory module 108) are located in other components or are distributed between several components. In some embodiments, processor 101 is GPU 540. Further, in some embodiments, GPU 540 is included elsewhere, such as being separately connected to bus 510. In the illustrated embodiment, GPU 540 communicates with system memory 505 over the bus 510. However, some embodiments of GPU 540 communicate with system memory 505 over a direct connection or via other buses, bridges, switches, routers, and the like. GPU 540 can execute instructions stored in system memory 505 and GPU 540 can store information in system memory 505 such as the results of the executed instructions. For example, system memory 505 can store a copy 520 of instructions from a program code that is to be executed by GPU 540.

Computing system 500 also includes a central processing unit (CPU) 515 configured to execute instructions concurrently or in parallel. The CPU 515 is connected to the bus 510 and can therefore communicate with GPU 540 and system memory 505 via bus 510. CPU 515 can execute instructions such as program code 545 stored in system memory 505 and CPU 515 can store information in system memory 505 such as the results of the executed instructions. CPU 515 is also able to initiate graphics processing by issuing draw calls to GPU 540.

An input/output (I/O) engine 525 handles input or output operations associated with display 530, as well as other elements of computing system 500 such as keyboards, mice, printers, external disks, and the like. I/O engine 525 is coupled to bus 510 so that I/O engine 525 is able to communicate with system memory 505, GPU 540, or CPU 515. In the illustrated embodiment, I/O engine 525 is configured to read information stored on an external storage component 535, which is implemented using a non-transitory computer readable medium such as a compact disk (CD), a digital video disc (DVD), and the like. I/O engine 525 can also write information to external storage component 535, such as the results of processing by GPU 540 or CPU 515.

In some embodiments, a computer readable storage medium includes any non-transitory storage medium, or combination of non-transitory storage media, accessible by a computer system during use to provide instructions and/or data to the computer system. In various embodiments, such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. In some embodiments, the computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. In some embodiments, the software includes the instructions and certain data that, when executed by the one or more processors, manipulate the one or more processors to perform one or more aspects of the techniques described above. For example, in some cases, the non-transitory computer readable storage medium includes a magnetic or optical disk storage device, solid state storage devices such as Flash memory, a cache, random access memory (RAM) or other non-volatile memory device or devices, and the like. In some embodiments, the executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device are not required, and that one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter could be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above could be altered or modified and all such variations are considered within the scope of the disclosed subject matter. Accordingly, the protection sought herein is as set forth in the claims below.

Within this disclosure, in some cases, different entities (which are variously referred to as "components," "units," "devices," "modules," etc.) are described or claimed as "configured" to perform one or more tasks or operations. This formulation-[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory module configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

What is claimed is:

1. An integrated circuit (IC), comprising:
a comparison module configured to indicate a result of a comparison between loaded data of a workgroup and a specified value, wherein the loaded data is generated as a result of a waiting atomic instruction, and wherein the result of the comparison representing a failed match indicates the workgroup is waiting for at least one synchronization variable;
a synchronization monitor configured to receive the indicated result from the comparison module, and, in response to the result indicating a failed match, monitor the workgroup; and
a compute unit configured to send the loaded data of the workgroup and the specified value to the comparison module, and to perform a context switch that prevents execution of the workgroup in response to an indication that the synchronization monitor is monitoring the workgroup.

2. The IC of claim 1, wherein the compute unit is further configured to generate the loaded data by instructing the workgroup to perform the waiting atomic instruction.

3. The IC of claim 1, wherein monitoring the workgroup comprises the synchronization monitor storing data indicative of the workgroup and data indicative of the at least one synchronization variable.

4. The IC of claim 3, further comprising:
a workgroup scheduler configured to periodically check whether the at least one synchronization variable is available and to indicate to the compute unit that the workgroup should be resumed in response to detecting that the at least one synchronization variable is available.

5. The IC of claim 4, wherein checking whether the at least one synchronization variable is available comprises accessing the synchronization monitor.

6. The IC of claim 4, further comprising:
a monitor log configured to store the data indicative of the workgroup and the data indicative of the at least one synchronization variable, wherein monitoring the workgroup further comprises the synchronization monitor sending the data indicative of the workgroup and the data indicative of the at least one synchronization variable to the monitor log.

7. The IC of claim 6, wherein checking whether the at least one synchronization variable is available comprises accessing the monitor log.

8. The IC of claim 7, wherein the workgroup scheduler is configured to access the monitor log via the synchronization monitor.

9. A method comprising:
instructing a plurality of workgroups to perform a waiting atomic instruction;
detecting a failure to perform the waiting atomic instruction, wherein failure to perform the waiting atomic instruction indicates that at least one work-item of a corresponding workgroup is in a waiting state, and wherein the waiting state indicates that the corresponding workgroup is waiting for a synchronization variable;

monitoring, by a synchronization monitor, one or more workgroups including work-items that are in the waiting state; and performing a context switch of a first workgroup in response to the synchronization monitor indicating that at least one work-item of the first workgroup is in the waiting state, wherein the context switch prevents execution of the first workgroup.

10. The method of claim 9, further comprising, in response to a memory access that targets a monitored address associated with the first workgroup, resuming execution of the first workgroup.

11. The method of claim 10, wherein the monitored address stores the synchronization variable.

12. The method of claim 9, wherein monitoring the one or more workgroups comprises storing data indicative of the one or more workgroups and data indicative of monitored addresses associated with the one or more workgroups in a monitor database of the synchronization monitor.

13. The method of claim 12, wherein monitoring the one or more workgroups further comprises storing the data indicative of the one or more workgroups and data indicative of monitored addresses associated with the one or more workgroups in a monitor log.

14. The method of claim 13, further comprising:
subsequent to storing the data indicative of the monitored addresses in the monitor log, checking, by a workgroup scheduler, whether at least one of the one or more workgroups is ready to resume execution.

15. The method of claim 14, further comprising:
subsequent to determining that a plurality of the one or more workgroups are ready to resume execution, resuming execution of the plurality of the one or more workgroups.

16. The method of claim 9, wherein the waiting atomic instruction comprises a load operation, a compare operation between loaded data and a specified value, and a write operation.

17. The method of claim 16 wherein the waiting atomic instruction is a compare-and-swap operation.

18. An integrated circuit (IC), comprising:
a comparison module configured to indicate a result of a comparison between loaded data of a workgroup and a specified operand, wherein the result of the comparison representing a failed match indicates the workgroup is waiting for at least one synchronization variable;
a synchronization monitor configured to receive the indicated result from the comparison module, and, in response to the result indicating a failed match, store data indicative of the workgroup and the at least one synchronization variable; and
a compute unit configured to instruct the workgroup to perform a waiting atomic instruction and to send data generated as a result of the waiting atomic instruction as the loaded data to the comparison module.

19. The IC of claim 18, wherein the compute unit is configured to instruct the workgroup to perform the waiting atomic instruction in response to an indication that resources of the compute unit are oversubscribed.

20. The IC of claim 18, wherein the synchronization monitor is further configured to monitor synchronization variables of work-instances of the workgroup.

* * * * *